April 14, 1931. J. HASTIE 1,800,937
BENCH CLAMP
Filed March 23, 1929
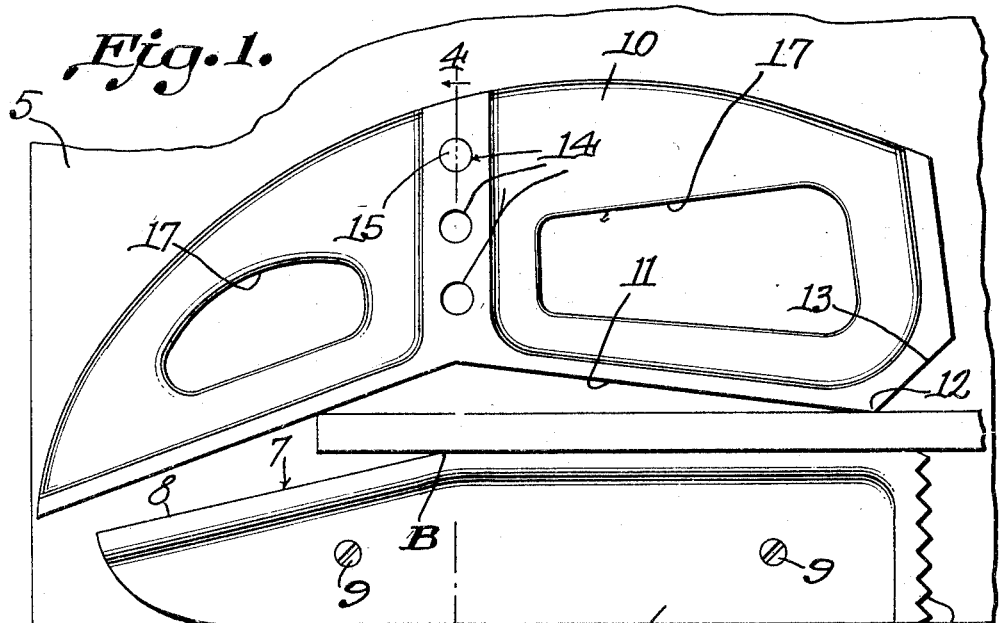
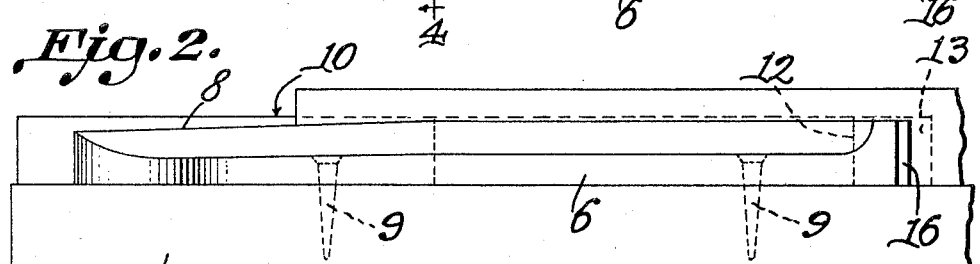
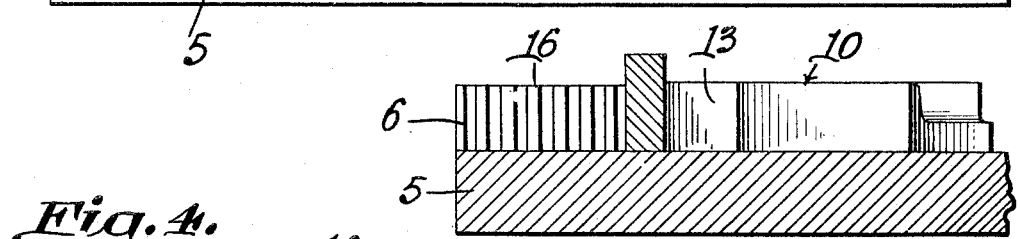
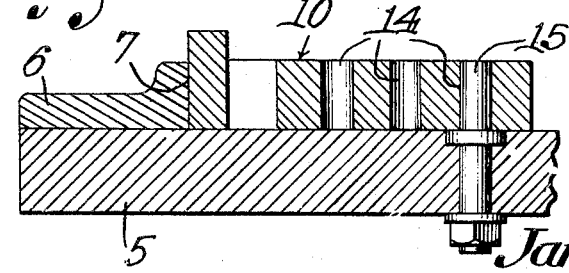
James Hastie Inventor Patented Apr. 14, 1931

1,800,937

UNITED STATES PATENT OFFICE

JAMES HASTIE, OF ATASCADERO, CALIFORNIA

BENCH CLAMP

Application filed March 23, 1929. Serial No. 349,496.

This invention relates to a bench clamp especially designed for use in connection with carpenters' benches, the primary object of the invention being to provide a clamp of this character which will automatically adjust itself to receive and grip articles of various thicknesses.

Another object of the invention is to provide a clamp of this character which will exert pressure on the work at three points along the board or work held in the clamp, thereby insuring against slipping of the work while in the clamp.

A still further object of the invention is to provide a clamp including a stationary member and a pivoted member, means being provided whereby the pivoted member may be adjusted laterally with respect to the stationary member, adapting the clamp for use in clamping exceptionally wide boards.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a clamp constructed in accordance with the invention.

Figure 2 is a side elevational view thereof.

Figure 3 is an end elevational view of the clamp.

Figure 4 is a sectional view taken on line 4—4 of Figure 1.

Referring to the drawing in detail, the reference character 5 designates a supporting surface, which in the present showing is a carpenter's work bench.

The clamp includes a stationary member 6 provided with a substantially wide inner edge 7, the inner edge having an inclined end portion 8, inclined towards the outer edge of the stationary member.

The stationary member 6 is provided with openings to receive the securing screws 9 that secure the stationary member 6 to the bench or supporting surface.

Cooperating with the stationary member is a pivoted member 10, the inner edge of the member 10 indicated at 11 being disposed at oblique angles with respect to the outer edge of the pivoted member 10. At one end of the pivoted member is a sharp edge 12 formed by the cut away portion 13 which is disposed at an oblique angle in a direction opposite to the edge 11. Openings 14 are formed in the pivoted member 10 and accommodate the pin 15 that extends upwardly from the work bench so that the pivoted member may be readily lifted from its position over the pin and replaced so that another opening of the pivoted member receives the pin, thereby providing an adjustment of the pivoted member so that it may be moved towards or away from the stationary member adapting it for use with wider or narrower boards to be planed.

In the use of the device a board to be planed or otherwise worked, may be slid between the stationary member and the pivoted member. As the forward end of the work reaches the inclined surface at the outer end of the pivoted member, the pivoted member is moved so that the rear end thereof is forced into close engagement with the work setting up a binding action at point B on the stationary member and gripping the work at three different points.

It will be seen that the work may be readily removed from the clamp by merely sliding the work rearwardly from between the stationary and movable members of the clamp.

One end of the stationary member is formed with teeth 16 so that one end of a two by four or larger timber may be moved thereagainst and held against lateral movement while it is being planed or sawed.

It might be further stated that the movable member is provided with openings 17 whereby the movable member may be readily grasped by the operator and lifted or moved to adjust the movable member with respect to the stationary member.

I claim:

A self-acting bench clamp including a stationary member having a substantially straight inner edge terminating in an obliquely disposed portion, a movable member pivoted intermediate its ends and having one of its edges disposed in parallel spaced relation with the straight inner surface and obliquely disposed surface of the stationary member, and means for adjustably supporting the movable member.

In testimony that I claim the foregoing as my own, I have hereto affixed my signature.

JAMES HASTIE.